US012560247B2

(12) United States Patent
Burlot et al.

(10) Patent No.: US 12,560,247 B2
(45) Date of Patent: Feb. 24, 2026

(54) SEAT INSERT FOR A CRYOGENIC BALL VALVE

(71) Applicant: SAINT-GOBAIN PERFORMANCE PLASTICS CORPORATION, Solon, OH (US)

(72) Inventors: Philippe Burlot, Le Quillio (FR); Herman M. Dubois, Duffel (BE); Jan Kustermans, Brecht (BE); Filip Rousseau, Aartselaar (BE)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 0 days.

(21) Appl. No.: 17/644,237

(22) Filed: Dec. 14, 2021

(65) Prior Publication Data

US 2022/0196161 A1      Jun. 23, 2022

Related U.S. Application Data

(60) Provisional application No. 63/128,928, filed on Dec. 22, 2020.

(51) Int. Cl.
F16K 5/06          (2006.01)
(52) U.S. Cl.
CPC .................................. F16K 5/0689 (2013.01)
(58) Field of Classification Search
CPC .... F16K 5/0689; F16K 5/0678; F16K 5/0673; F16J 15/3236
USPC ........................................................ 251/162
See application file for complete search history.

(56) References Cited

U.S. PATENT DOCUMENTS

| | | | |
|---|---|---|---|
| 2,788,017 A | 4/1957 | Scherer | |
| 3,604,682 A | 9/1971 | Richards | |
| 3,642,248 A * | 2/1972 | Benware ................... | F16K 3/12 |
| | | | 251/174 |

(Continued)

FOREIGN PATENT DOCUMENTS

| | | |
|---|---|---|
| CA | 1292463 C | 11/1991 |
| CN | 105587890 A | 5/2016 |

(Continued)

OTHER PUBLICATIONS

International Search Report and Written Opinion for PCT/US2021/072908, mailed Apr. 6, 2022, 10 pages.

*Primary Examiner* — Michael R Reid
(74) *Attorney, Agent, or Firm* — Abel Schillinger, LLP; Ann Palma

(57)          ABSTRACT

Systems and methods are disclosed that include providing a valve suitable for maintaining a seal and preventing fluid flow through the valve at cryogenic temperatures. The valve includes a valve body having a longitudinal axis along a flow path through the valve, a ball selectively rotatable within the valve body to selectively allow fluid flow through the valve, a seat insert cavity formed within the valve body, and a seat insert assembly at least partially disposed within the seat insert cavity. The seat insert assembly includes a seat insert comprising at least one sealing lip and a support ring engaged with the at least one sealing lip and configured to bias the at least one sealing lip against a portion of the seat insert cavity to prevent leakage through a second leakage path when the ball valve is selectively rotated to prevent fluid flow through the valve.

5 Claims, 11 Drawing Sheets

(56) References Cited

U.S. PATENT DOCUMENTS

| | | | |
|---|---|---|---|
| 4,111,393 A | 9/1978 | McClurg et al. | |
| 4,258,900 A | 3/1981 | Kindersley | |
| 4,706,970 A * | 11/1987 | Ramirez | F16J 15/3212 |
| | | | 277/556 |
| 4,988,076 A * | 1/1991 | Burton | F16K 5/0678 |
| | | | 251/307 |
| 5,419,532 A * | 5/1995 | Fan | F16K 5/0673 |
| | | | 251/315.08 |
| 5,507,505 A * | 4/1996 | von-Arndt | F16J 15/3236 |
| | | | 277/560 |
| 6,007,070 A | 12/1999 | Heathcott et al. | |
| 7,428,912 B2 * | 9/2008 | Pozzati | F16K 5/0694 |
| | | | 277/567 |
| 9,657,848 B2 | 5/2017 | Balan et al. | |
| 9,777,841 B2 | 10/2017 | Balan et al. | |
| 9,982,789 B2 | 5/2018 | Mircea | |
| 10,539,242 B2 | 1/2020 | Balan et al. | |
| 2007/0013143 A1 * | 1/2007 | Schroeder | F16J 15/3236 |
| | | | 277/551 |
| 2016/0327167 A1 | 11/2016 | Kothadia et al. | |
| 2018/0340620 A1 | 11/2018 | Wicher et al. | |
| 2020/0300367 A1 * | 9/2020 | Caglio | F16J 15/186 |
| 2020/0386324 A1 | 12/2020 | Bach Cantenys et al. | |

FOREIGN PATENT DOCUMENTS

| | | | | |
|---|---|---|---|---|
| CN | 106151574 A | 11/2016 | | |
| CN | 106704629 A | 5/2017 | | |
| CN | 209041630 U | 6/2019 | | |
| EP | 3343076 A1 | 7/2018 | | |
| GB | 1426519 A * | 3/1976 | | F16K 5/0647 |
| GB | 2497850 A * | 6/2013 | | F16J 15/18 |
| JP | S50049726 U | 5/1975 | | |
| JP | H08303614 A | 11/1996 | | |
| JP | 2005048853 A | 2/2005 | | |
| JP | 2006105189 A | 4/2006 | | |
| JP | 2009185858 A | 8/2009 | | |
| JP | 2018054070 A | 4/2018 | | |
| JP | 2019108953 A | 7/2019 | | |
| JP | 2019128018 A | 8/2019 | | |
| WO | 2019052812 A1 | 3/2019 | | |
| WO | 2021137995 A1 | 7/2021 | | |
| WO | 2022140736 A1 | 6/2022 | | |

* cited by examiner

SEAT INSERT FOR A CRYOGENIC BALL VALVE

CROSS-REFERENCE TO RELATED APPLICATION(S)

This application claims priority under 35 U.S.C. § 119(e) to U.S. Provisional Application No. 63/128,928, entitled "SEAT INSERT FOR A CRYOGENIC BALL VALVE," by Philippe BURLOT et al., filed Dec. 22, 2020, which is assigned to the current assignee hereof and incorporated herein by reference in its entirety.

BACKGROUND OF THE INVENTION

Valves are used to control the flow of fluids in a wide range of applications. Ball valves are typically used in applications where interruption of the flow of fluid through the ball valve is required. The interruption and establishment of fluid flow through the ball valve is accomplished via selective actuation of a ball within the ball valve. Generally, a seat insert within the ball valve provides a seal against the ball and a portion of the body of the ball valve. However, when a ball valve is subjected to extreme environmental conditions such as cryogenic temperatures, the seat insert and/or other portions of the ball valve may shrink, deform, or otherwise change, thereby allowing leakage of the fluid through the ball valve. Accordingly, the industry continues to demand improvements in ball valve technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
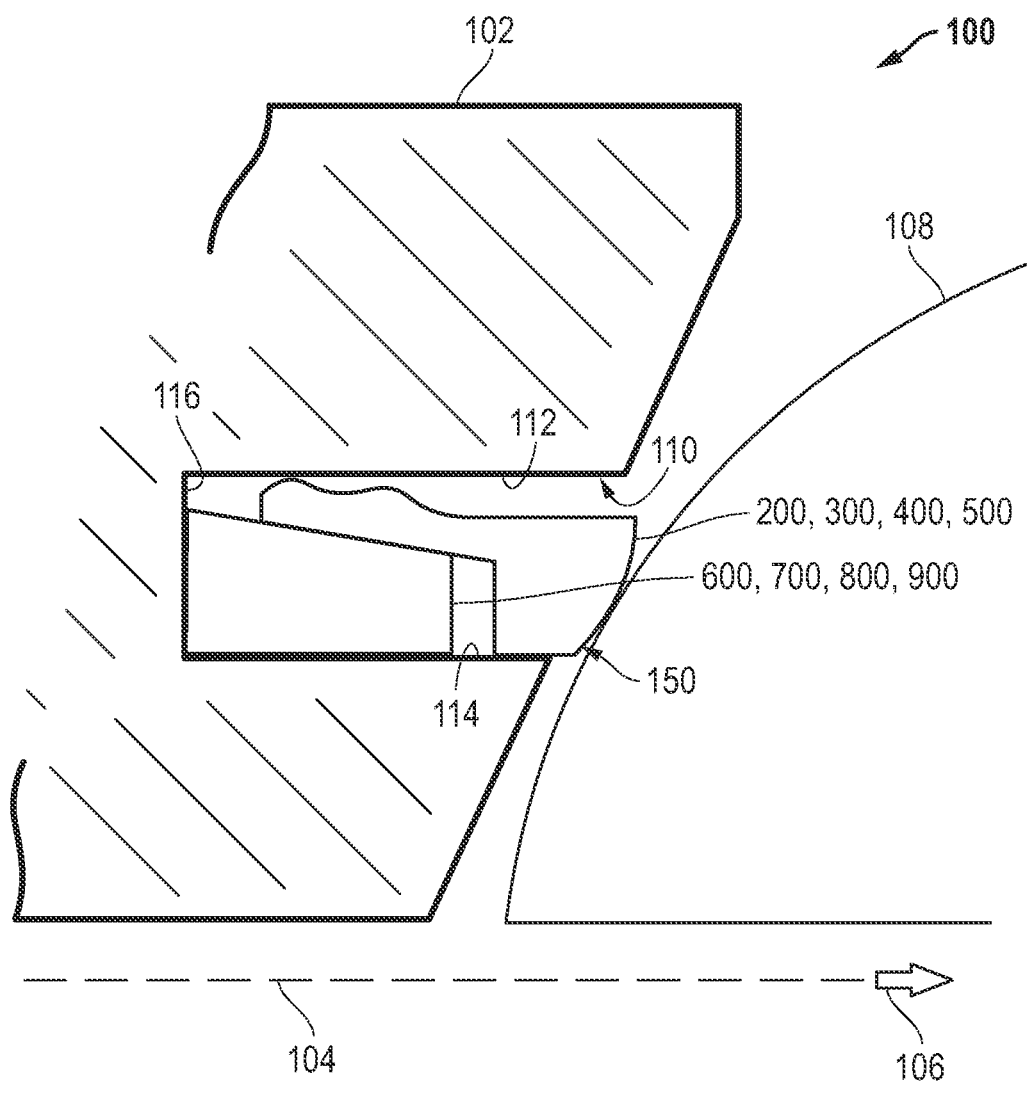
FIG. 1 shows a partial cross-sectional view of a valve having an annular seat insert assembly according to an embodiment of the disclosure.

FIG. 1 shows a partial cross-sectional view of a valve 100 having an annular seat insert assembly 150 according to an embodiment of the disclosure. The valve 100 may generally comprise a ball valve and comprise a valve body 102 having a longitudinal axis 104 along a flow path 106 through the valve 100 and a ball 108 selectively rotatable within the valve body 102 to selectively allow fluid flow along the flow path 106 and through the valve 100. Valve 100 may also comprise a seat insert cavity 110 formed within the valve body 102. The seat insert cavity 110 may generally comprise a first inner surface 112, a second inner surface 114 opposite of the first inner surface 112, and a back surface or wall 116 disposed between the first inner surface 112 and the second inner surface 114. In some embodiments, the first inner surface 112 and/or the second inner surface 114 may be substantially axially planar. Additionally, in some embodiments, the first inner surface 112 and the second inner surface 114 may be substantially parallel. In some embodiments, the back surface or wall 116 may be substantially radially planar. Additionally, in some embodiments, the back surface or wall 116 may be substantially perpendicular to the first inner surface 112 and/or the second inner surface 114.

An annular seat insert assembly 150 may generally be at least partially disposed within the seat insert cavity 110. The seat insert assembly 150 may generally comprise a seat insert 200, 300, 400, 500 comprising at least one sealing lip and a support ring 600, 700, 800, 900 engaged with the at least one sealing lip and configured to bias the at least one sealing lip against a portion of a seat insert cavity 110. In the embodiment shown, the at least one sealing lip of the seat insert 200, 300, 400, 500 may comprise a single sealing lip. In some embodiments, the seat insert assembly 150 may be designed to prevent leakage of a fluid through each of a first leakage path (between the ball 108 and the seat insert assembly 150) and a second leakage path (between the seat insert cavity 110 and the seat insert assembly 150) when the ball 108 is selectively rotated to prevent fluid flow along the flow path 106 and through the valve 100.

Figure 2:
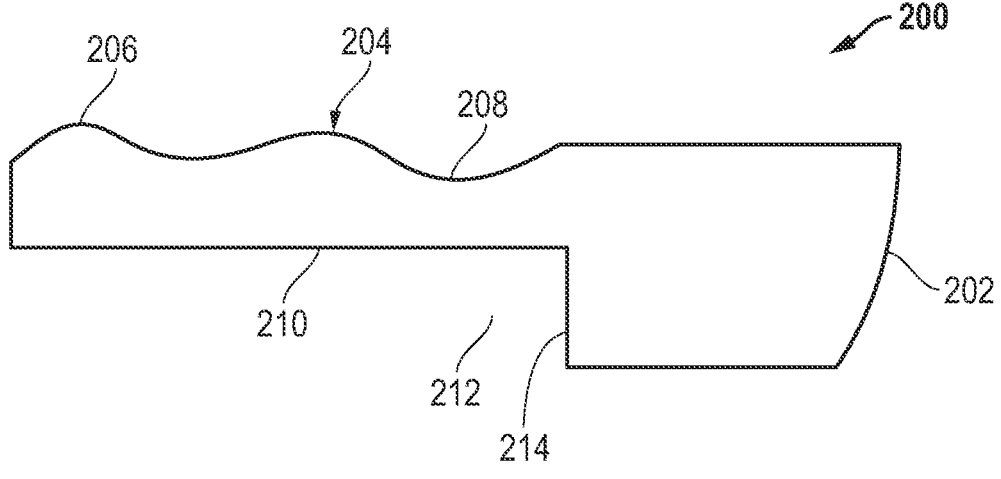
FIGS. 2 to 5 show partial cross-sectional views of various embodiments of an annular seat insert according to the disclosure.

FIGS. 2 to 5 are partial cross-sectional views of various embodiments of an annular seat insert 200, 300, 400, 500 according to embodiments of the disclosure. As shown in FIG. 2, the seat insert 200 may generally comprise a first sealing surface 202 that forms a first sealing interface with the ball 108 of the valve 100 to prevent leakage through a first leakage path. In some embodiments, the first sealing surface 202 may be curved, curvilinear, planar, or combinations thereof. The seat insert 200 may also comprise at least one sealing lip 204. The sealing lip 204 may form a second sealing interface with a portion of the seat insert cavity 110 to prevent leakage through a second leakage path. In some embodiments, the sealing lip 204 may be an outer sealing lip that forms the second sealing interface with the first inner surface 112 of the seat insert cavity 110. Further, in some embodiments, the sealing lip 204 may comprise sealing bumps, teeth, or undulations 206 in contact with the seat insert cavity 110. In some embodiments, the sealing bumps, teeth, or undulations 206 may be disposed on an outer surface 208 of the sealing leg 204. The sealing lip 204 may comprise an inner surface 210 and an inner end 214 that form a cavity 212 in the seat insert 200. In some embodiments, the inner surface 210 of the sealing lip 204 may be flat. In some embodiments, the flat inner surface 210 may be substantially axially planar.

Figure 3:
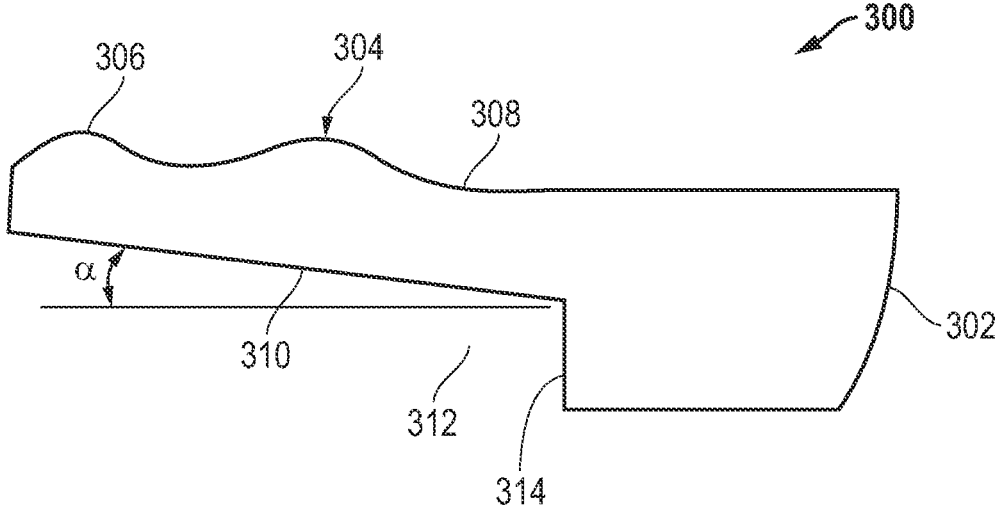

As shown in FIG. 3, the seat insert 300 may generally comprise a first sealing surface 302 that forms a first sealing interface with the ball 108 of the valve 100 to prevent leakage through a first leakage path. In some embodiments, the first sealing surface 302 may be curved, curvilinear, planar, or combinations thereof. The seat insert 300 may also comprise at least one sealing lip 304. The sealing lip 304 may form a second sealing interface with a portion of the seat insert cavity 110 to prevent leakage through a second leakage path. In some embodiments, the sealing lip 304 may be an outer sealing lip that forms the second sealing interface with the first inner surface 112 of the seat insert cavity 110. Further, in some embodiments, the sealing lip 304 may comprise sealing bumps, teeth, or undulations 306 in contact with the seat insert cavity 110. In some embodiments, the sealing bumps, teeth, or undulations 306 may be disposed on an outer surface 308 of the sealing lip 304. The sealing lip 304 may comprise an inner surface 310 and an inner end 314 that form a cavity 312 in the seat insert 300.

In some embodiments, the inner surface 310 of the sealing lip 304 may be angled. In some embodiments, the inner surface 310 of the sealing lip 304 may comprise an angle (α) with respect to the longitudinal axis 104 of the valve 100. In some embodiments, the inner surface 310 of the sealing lip 304 may comprise an angle (α) of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees. In some embodiments, the inner surface 310 of the sealing lip 304 may comprise an angle (α) of not greater than 45 degrees, not greater than 40 degrees, not greater than 35 degrees, not greater than 30 degrees, not greater than 25 degrees, not greater than 20 degrees, or not greater than 15 degrees. Further, it will be appreciated that the inner surface 310 of the sealing lip 304 may comprise an angle (α) between any of these minimum and maximum values, such as at least 5 degrees and not greater than 45 degrees.

Figure 4:
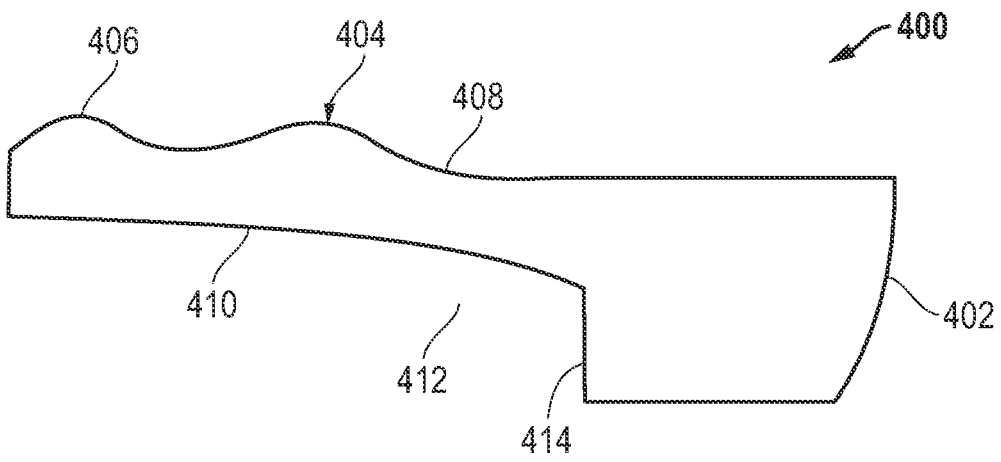

As shown in FIG. 4, the seat insert 400 may generally comprise a first sealing surface 402 that forms a first sealing interface with the ball 108 of the valve 100 to prevent leakage through a first leakage path. In some embodiments, the first sealing surface 402 may be curved, curvilinear, planar, or combinations thereof. The seat insert 400 may also comprise at least one sealing lip 404. The sealing lip 404 may form a second sealing interface with a portion of the seat insert cavity 110 to prevent leakage through a second leakage path. In some embodiments, the sealing lip 404 may be an outer sealing lip that forms the second sealing interface with the first inner surface 112 of the seat insert cavity 110. Further, in some embodiments, the sealing lip 404 may comprise sealing bumps, teeth, or undulations 406 in contact with the seat insert cavity 110. In some embodiments, the sealing bumps, teeth, or undulations 406 may be disposed on an outer surface 408 of the sealing lip 404. The sealing lip 404 may comprise an inner surface 410 and an inner end 414 that form a cavity 412 in the seat insert 400. In some embodiments, the inner surface 410 of the sealing lip 404 may be curved.

Figure 5:
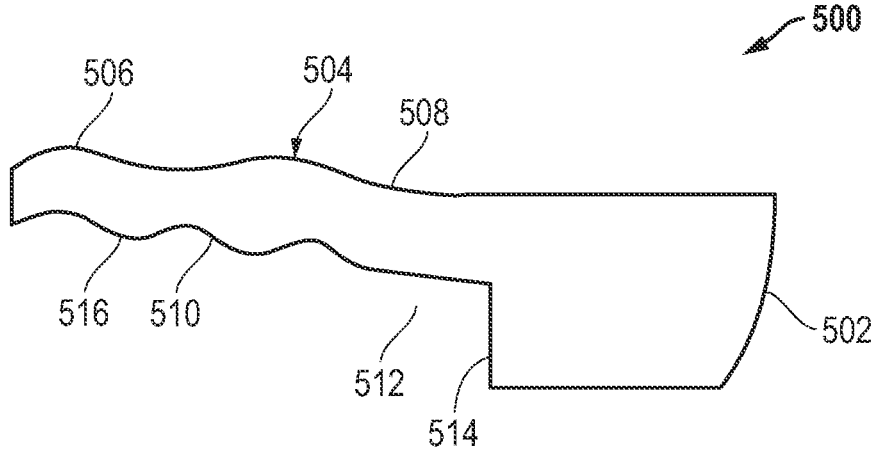

As shown in FIG. 5, the seat insert 500 may generally comprise a first sealing surface 502 that forms a first sealing interface with the ball 108 of the valve 100 to prevent leakage through a first leakage path. In some embodiments, the first sealing surface 502 may be curved, curvilinear, planar, or combinations thereof. The seat insert 500 may also comprise at least one sealing lip 504. The sealing lip 504 may form a second sealing interface with a portion of the seat insert cavity 110 to prevent leakage through a second leakage path. In some embodiments, the sealing lip 504 may be an outer sealing lip that forms the second sealing interface with the first inner surface 112 of the seat insert cavity 110. Further, in some embodiments, the sealing lip 504 may comprise sealing bumps, teeth, or undulations 506 in contact with the seat insert cavity 110. In some embodiments, the sealing bumps, teeth, or undulations 506 may be disposed on an outer surface 508 of the sealing lip 504. The sealing lip 504 may comprise an inner surface 510 and an inner end 514 that forms a cavity 512 in the seat insert 500. In some embodiments, the inner surface 510 of the sealing lip 504 may comprise sealing bumps, teeth, or undulations 516. Furthermore, in some embodiments, any of the seat inserts 200, 300, 400 may comprise sealing bumps, teeth, or undulations 516 on one or more of their respective inner surfaces 210, 310, 410.

In some embodiments, the seat insert 200, 300, 400, 500 may be formed from PTFE, a fluoropolymer, a perfluoropolymer, PTFE, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof. In some embodiments, the seat insert 200, 300, 400, 500 may be formed from a material modified with at least one filler.

Figure 6:
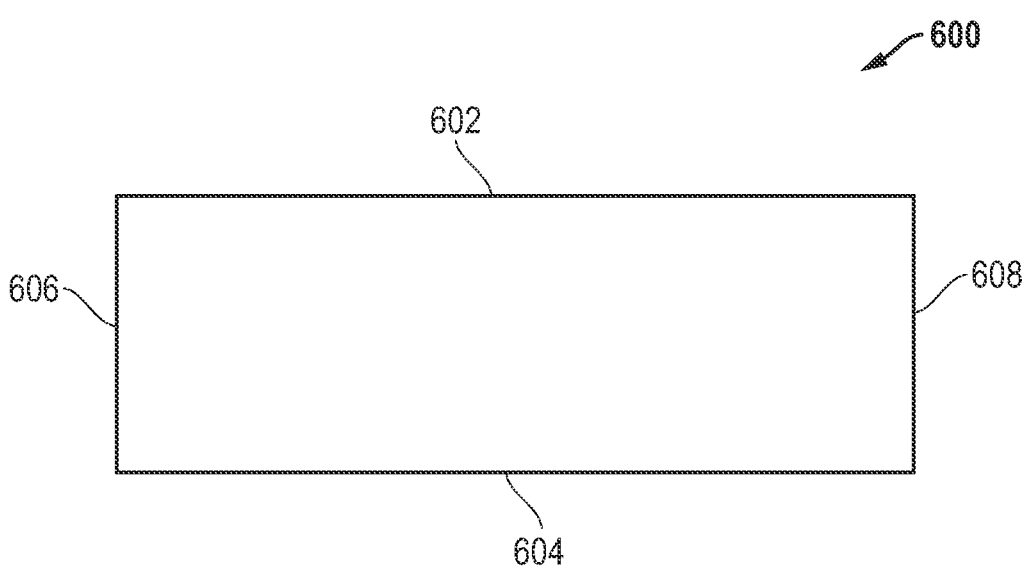
FIGS. 6 to 9 show partial cross-sectional views of various embodiments of an annular support ring according the disclosure.

FIGS. 6 to 9 are partial cross-sectional views of various embodiments of an annular support ring 600, 700, 800, 900 according to embodiments of the disclosure. As shown in FIG. 6, the support ring 600 may generally comprise an outer surface 602, an inner surface 604 opposite the outer surface 602, a first end 606, and a second end 608 opposite the first end 606. The outer surface 602 of the support ring 600 may be configured to engage the inner surface 210, 310, 410, 510 of the sealing lip 204, 304, 404, 504 of the seat insert 200, 300, 400, 500. In some embodiments, the outer surface 602 of the support ring 600 may be flat. In some embodiments, the flat outer surface 602 may be substantially axially planar. Additionally, in some embodiments, the inner surface 604 may be configured to contact the second inner surface 114 of the seat insert cavity 110 of the valve 100.

Figure 7:
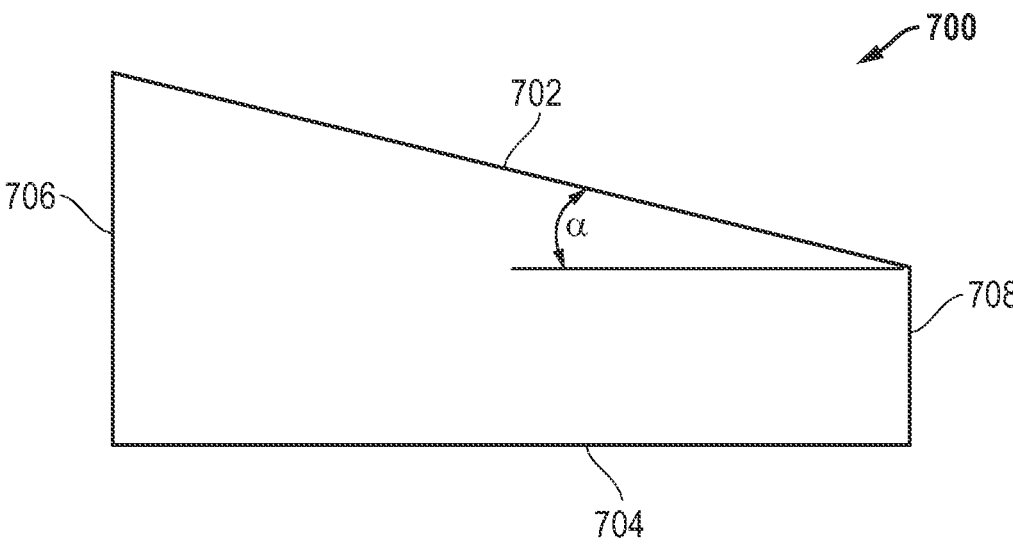

As shown in FIG. 7, the support ring 700 may generally comprise an outer surface 702, an inner surface 704 opposite the outer surface 702, a first end 706, and a second end 708 opposite the first end 706. The outer surface 702 of the support ring 700 may be configured to engage the inner surface 210, 310, 410, 510 of the sealing lip 204, 304, 404, 504 of the seat insert 200, 300, 400, 500. In some embodiments, the outer surface 702 of the support ring 700 may be angled. In some embodiments, the outer surface 702 of the support ring 700 may comprise an angle (α) with respect to the longitudinal axis 104 of the valve 100. In some embodiments, the outer surface 702 of the support ring 700 may comprise an angle (α) of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees. In some embodiments, the outer surface 702 of the support ring 700 may comprise an angle (α) of not greater than 45 degrees, not greater than 40 degrees, not greater than 35 degrees, not greater than 30 degrees, not greater than 25 degrees, not greater than 20 degrees, or not greater than 15 degrees. Further, it will be appreciated that the in outer surface 702 of the support ring 700 may comprise an angle (α) between any of these minimum and maximum values, such as at least 5 degrees and not greater than 45 degrees. Additionally, in some embodiments, the inner surface 704 may be configured to contact the second inner surface 114 of the seat insert cavity 110 of the valve 100.

Figure 8:
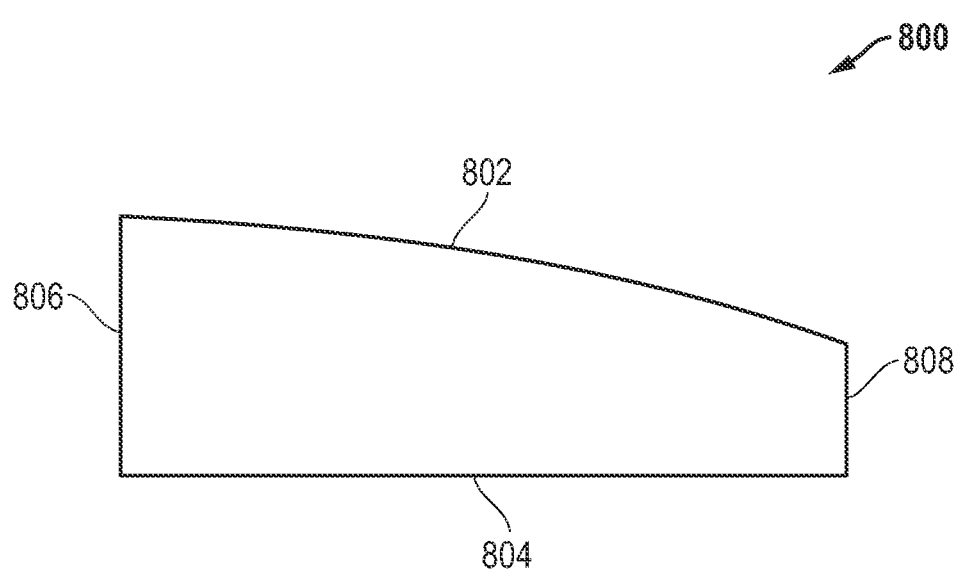

As shown in FIG. 8, the support ring 800 may generally comprise an outer surface 802, an inner surface 804 opposite the outer surface 802, a first end 806, and a second end 808 opposite the first end 806. The outer surface 802 of the support ring 800 may be configured to engage the inner surface 210, 310, 410, 510 of the sealing lip 204, 304, 404, 504 of the seat insert 200, 300, 400, 500. In some embodiments, the outer surface 802 of the support ring 800 may be arced or curved. Additionally, in some embodiments, the inner surface 804 may be configured to contact the second inner surface 114 of the seat insert cavity 110 of the valve 100.

Figure 9:
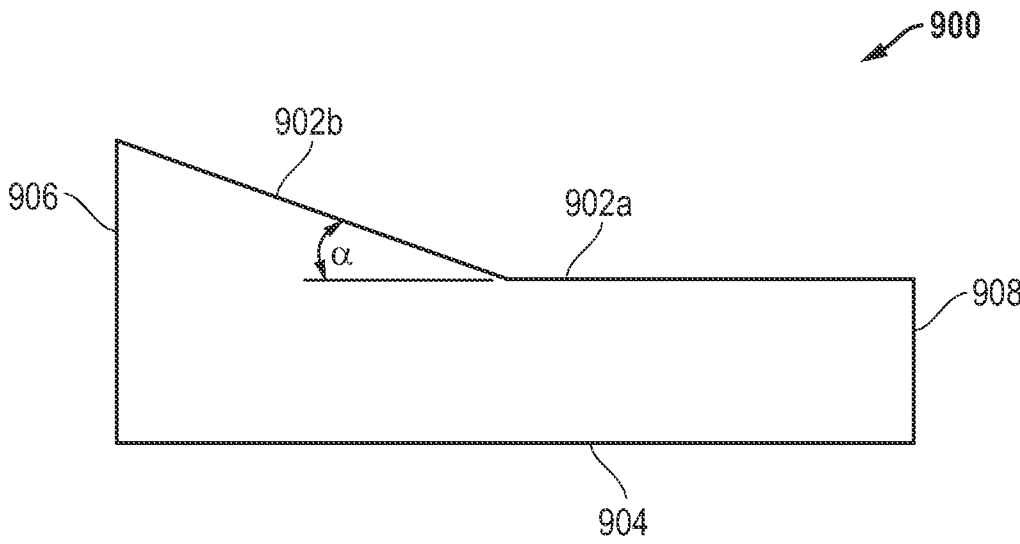

As shown in FIG. 9, the support ring 900 may generally comprise an outer surface 902, an inner surface 904 opposite the outer surface 902, a first end 906, and a second end 908 opposite the first end 906. The outer surface 902 of the support ring 900 may be configured to engage the inner surface 210, 310, 410, 510 of the sealing lip 204, 304, 404, 504 of the seat insert 200, 300, 400, 500. In some embodiments, the outer surface 902 of the support ring 900 may be dual angled. In some embodiments, a first angled portion 902a and a second angled portion 902b of the outer surface 902 of the support ring 900 may comprise an angle (α) with respect to the longitudinal axis 104 of the valve 100. In some embodiments, the first angled portion 902a of the outer surface 902 of the support ring 900 may comprise an angle (α) of between 0 and 45 degrees. In some embodiments, the second angled portion 902b of the outer surface 902 of the support ring 900 may comprise an angle (α) of between 0 and 45 degrees. Further, it will be appreciated that the first angled portion 902a of the outer surface 902 of the support ring 900 and the second angled portion 902b of the outer surface 902 of the support ring 900 may comprise different angles. Additionally, in some embodiments, the inner surface 904 may be configured to contact the second inner surface 114 of the seat insert cavity 110 of the valve 100.

In some embodiments, the support ring 600, 700, 800, 900 may be formed from a metallic material. In some embodiments, the metallic material may be nickel-chromium-based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze. In some embodiments, the support ring 600, 700, 800, 900 may comprise a coating or plating disposed over the metallic material. In some embodiments, the coating or plating may comprise a gold plating, a silver plating, a nickel plating, an aluminum chromium nitride (AlCrN) plating, a titanium aluminum nitride (TiAlN) plating, any other wear resistant metallic plating, or any combination thereof. Furthermore, in some embodiments, the support ring 600, 700, 800, 900 may comprise a split ring or split-type band.

When assembled, the seat insert assembly 150 may be at least partially disposed within the seat insert cavity 110 of the valve 100. The first end 606, 706, 806, 906 of the support ring 600, 700, 800, 900 may be in contact with the back surface 116 of the seat insert cavity 110 of the valve 100. Additionally, the second end 608, 708, 808, 908 of the support ring 600, 700, 800, 900 may not be in contact with the inner end 214, 314, 414, 514 of the seat insert 200, 300, 400, 500, such that there is a gap or void between the second end 608, 708, 808, 908 of the support ring 600, 700, 800, 900 and the inner end 214, 314, 414, 514 of the seat insert 200, 300, 400, 500. In some embodiments, the second end 608, 708, 808, 908 of the support ring 600, 700, 800, 900 may be flat. In some embodiments, the second end 608, 708, 808, 908 of the support ring 600, 700, 800, 900 may be curved or rounded.

The support ring 600, 700, 800, 900 may be engaged with the sealing lip 204, 304, 404, 504 and configured to bias the sealing lip 204, 304, 404, 504 against a portion of the seat insert cavity 110. More specifically, the outer surface 602, 702, 802, 902 of the support ring 600, 700, 800, 900 may be configured to engage the inner surface 210, 310, 410, 510 of the sealing lip 204, 304, 404, 504 and bias the sealing lip 204, 304, 404, 504 against the first inner surface 112 of the seat insert cavity 110, such that the outer surface 208, 308, 408, 508 of the sealing lip 204, 304, 404, 504 is in contact with the first inner surface 112 of the seat insert cavity 110 of the valve 100. Additionally, the inner surface 604, 704, 804, 904 of the support ring 600, 700, 800, 900 may be in contact with the second inner surface 114 of the seat insert cavity 110 of the valve 100.

In this configuration, pressure from contact between the seat insert 200, 300, 400, 500 and the ball 108 of the valve 100 biases or forces the support ring 600, 700, 800, 900 axially towards the seat insert 200, 300, 400, 500 to bias the sealing lip 204, 304, 404, 504 against the first inner surface 112 of the seat insert cavity 110, to increase contact pressure against the first inner surface 112 of the seat insert cavity 110, or combinations thereof to prevent leakage through the secondary leakage path. Furthermore, it will be appreciated that embodiments of a seat insert assembly 150 may comprise any combination of a seat insert 200, 300, 400, 500 and a support ring 600, 700, 800, 900.

Figure 10:
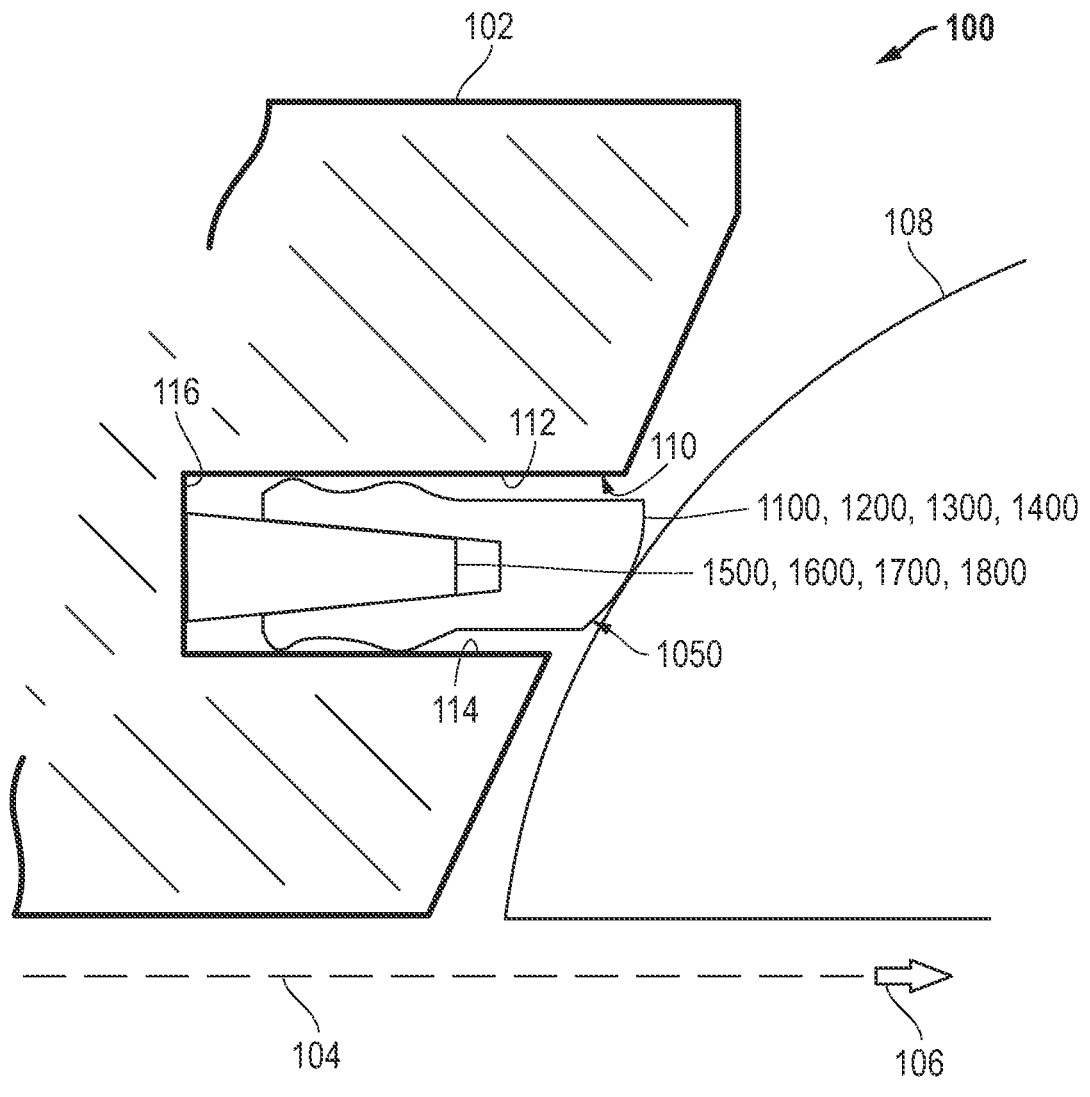
FIG. 10 shows a partial cross-sectional view of a valve having an annular seat insert assembly according to an embodiment of the disclosure.

FIG. 10 shows a partial cross-sectional view of a valve 100 having an annular seat insert assembly 1050 according to an embodiment of the disclosure. The annular seat insert assembly 1050 may generally be at least partially disposed within the seat insert cavity 110 of the valve 100. The seat insert assembly 1050 may generally comprise a seat insert 1100, 1200, 1300, 1400 comprising at least one sealing lip and a support ring 1500, 1600, 1700, 1800 engaged with the at least one sealing lip and configured to bias the at least one sealing lip against a portion of a seat insert cavity 110. In the embodiment shown, the at least one sealing lip of the seat insert 1100, 1200, 1300, 1400 may comprise a plurality of sealing lips. More specifically, in the embodiment shown, the at least one sealing lip of the seat insert 1100, 1200, 1300, 1400 may comprise a dual sealing lip. In some embodiments, the seat insert assembly 1050 may be designed to prevent leakage of a fluid through each of a first leakage path (between the ball 108 and the seat insert assembly 1050) and a second leakage path (between the seat insert cavity 110 and the seat insert assembly 1050) when the ball 108 is selectively rotated to prevent fluid flow along the flow path 106 and through the valve 100.

Figure 11:
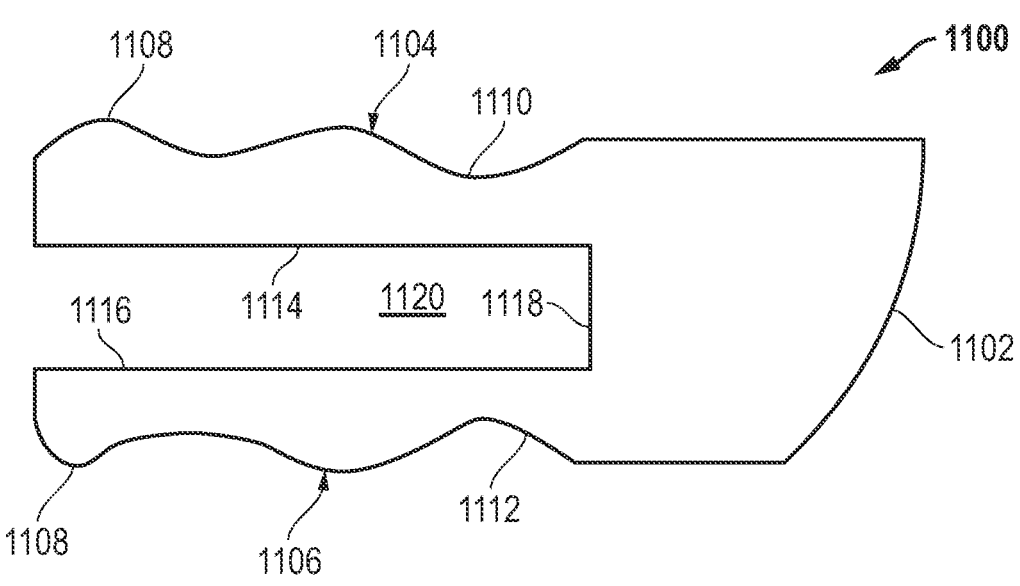
FIGS. 11 to 14 show partial cross-sectional views of various embodiments of an annular seat insert according the disclosure.

FIGS. 11 to 14 are partial cross-sectional views of various embodiments of an annular seat insert 1100, 1200, 1300, 1400 according to embodiments of the disclosure. As shown in FIG. 11, the seat insert 1100 may generally comprise a first sealing surface 1102 that forms a first sealing interface with the ball 108 of the valve 100 to prevent leakage through a first leakage path. In some embodiments, the first sealing surface 1102 may be curved, curvilinear, planar, or combinations thereof. The seat insert 1100 may also comprise at least one sealing lip. In some embodiments, the seat insert 1100 may comprise plurality of sealing lips 1104, 1106. In some embodiments, the plurality of sealing lips 1104, 1106 may comprise an outer sealing lip 1104 and an inner sealing lip 1106. The outer sealing lip 1104 and the inner sealing lip 1106 may form a second sealing interface with first inner surface 112 of the seat insert cavity 110 and the second inner surface 114 of the seat insert cavity 110, respectively to prevent leakage through the second leakage path. Further, in some embodiments, one or more of the sealing lips 1104, 1106 may comprise sealing bumps, teeth, or undulations 1108 in contact with the seat insert cavity 110. In some embodiments, the sealing bumps, teeth, or undulations 1108 may be disposed on outer surfaces 1110, 1112 of one or more of the sealing lips 1104, 1106. The outer sealing lip 1104 may comprise an inner surface 1114. The inner sealing lip 1106 may also comprise an inner surface 1116. The inner surface 1114 of the outer sealing lip 1104, the inner surface 1116 of the inner sealing lip 1106, and an inner end 1118 may form a cavity 1120 in the seat insert 1100. In some embodiments, the inner surfaces 1114, 1116 of the sealing lips 1104, 1106 may be flat. In some embodiments, the flat inner surfaces 1114, 1116 may be substantially axially planar.

Figure 12:
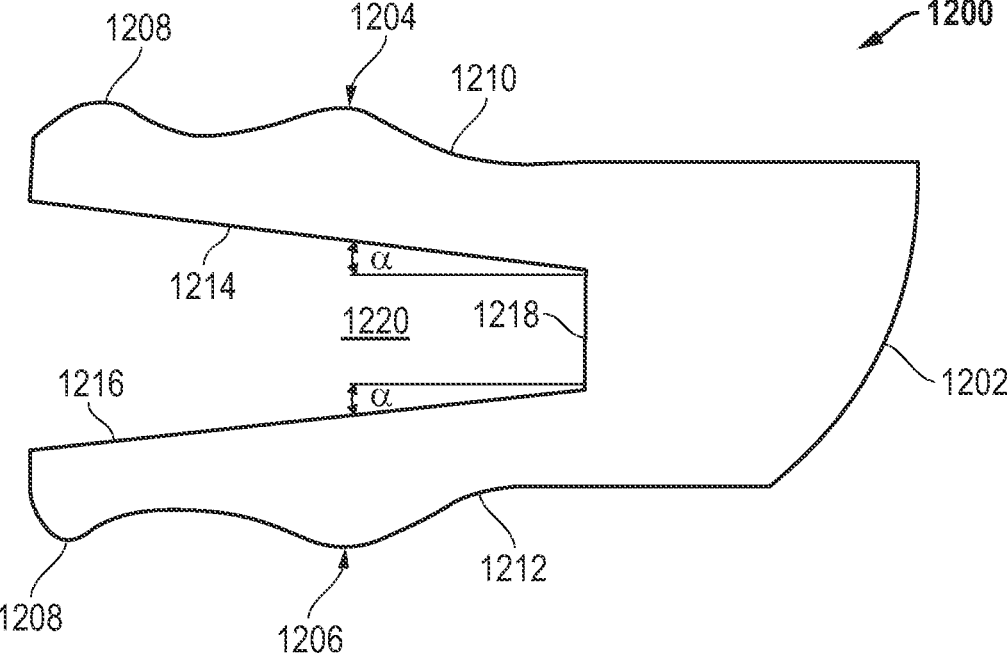

As shown in FIG. 12, the seat insert 1200 may generally comprise a first sealing surface 1202 that forms a first sealing interface with the ball 108 of the valve 100 to prevent leakage through a first leakage path. In some embodiments, the first sealing surface 1202 may be curved, curvilinear, planar, or combinations thereof. The seat insert 1200 may also comprise at least one sealing lip. In some embodiments, the seat insert 1200 may comprise plurality of sealing lips 1204, 1206. In some embodiments, the plurality of sealing lips 1204, 1206 may comprise an outer sealing lip 1204 and an inner sealing lip 1206. The outer sealing lip 1204 and the inner sealing lip 1206 may form a second sealing interface with first inner surface 112 of the seat insert cavity 110 and the second inner surface 114 of the seat insert cavity 110, respectively to prevent leakage through the second leakage path. Further, in some embodiments, one or more of the sealing lips 1204, 1206 may comprise sealing bumps, teeth, or undulations 1208 in contact with the seat insert cavity 110. In some embodiments, the sealing bumps, teeth, or undulations 1208 may be disposed on outer surfaces 1210, 1212 of one or more of the sealing lips 1204, 1206. The outer sealing lip 1204 may comprise an inner surface 1214. The inner sealing lip 1206 may also comprise an inner surface 1216. The inner surface 1214 of the outer sealing lip 1204, the inner surface 1216 of the inner sealing lip 1206, and an inner end 1218 may form a cavity 1220 in the seat insert 1200.

In some embodiments, the inner surfaces 1214, 1216 of the sealing lips 1204, 1206 may be angled. In some embodiments, the inner surfaces 1214, 1216 of the sealing lips 1204, 1206 may comprise an angle (α) with respect to the longitudinal axis 104 of the valve 100. In some embodiments, the inner surfaces 1214, 1216 of the sealing lips 1204, 1206 may comprise substantially similar angles. In some embodiments, the inner surfaces 1214, 1216 of the sealing lips 1204, 1206 may comprise different angles. In some embodiments, the inner surfaces 1214, 1216 of the sealing lips 1204, 1206 may comprise an angle (α) of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees. In some embodiments, the inner surfaces 1214, 1216 of the sealing lips 1204, 1206 may comprise an angle (α) of not greater than 45 degrees, not greater than 40 degrees, not greater than 35 degrees, not greater than 30 degrees, not greater than 25 degrees, not greater than 20 degrees, or not greater than 15 degrees. Further, it will be appreciated that the inner surfaces 1214, 1216 of the sealing lips 1204, 1206 may comprise an angle (α) between any of these minimum and maximum values, such as at least 5 degrees and not greater than 45 degrees.

Figure 13:
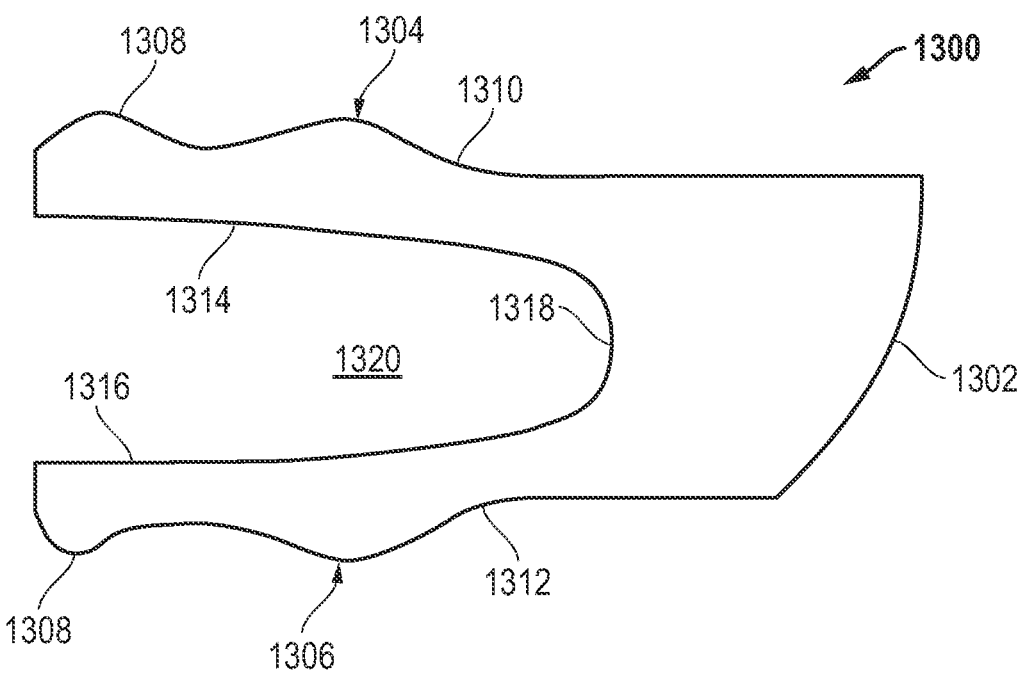

As shown in FIG. 13, the seat insert 1300 may generally comprise a first sealing surface 1302 that forms a first sealing interface with the ball 108 of the valve 100 to prevent leakage through a first leakage path. In some embodiments, the first sealing surface 1302 may be curved, curvilinear, planar, or combinations thereof. The seat insert 1300 may also comprise at least one sealing lip. In some embodiments, the seat insert 1300 may comprise plurality of sealing lips 1304, 1306. In some embodiments, the plurality of sealing lips 1304, 1306 may comprise an outer sealing lip 1304 and an inner sealing lip 1306. The outer sealing lip 1304 and the inner sealing lip 1306 may form a second sealing interface with first inner surface 112 of the seat insert cavity 110 and the second inner surface 114 of the seat insert cavity 110, respectively to prevent leakage through the second leakage path. Further, in some embodiments, one or more of the sealing lips 1304, 1306 may comprise sealing bumps, teeth, or undulations 1308 in contact with the seat insert cavity 110. In some embodiments, the sealing bumps, teeth, or undulations 1308 may be disposed on outer surfaces 1310, 1312 of one or more of the sealing lips 1304, 1306. The outer sealing lip 1304 may comprise an inner surface 1314. The inner sealing lip 1306 may also comprise an inner surface 1316. The inner surface 1314 of the outer sealing lip 1304, the inner surface 1316 of the inner sealing lip 1306, and an inner end 1318 may form a cavity 1320 in the seat insert 1300. In some embodiments, the inner surfaces 1314, 1316 of the sealing lips 1304, 1306 may be curved.

Figure 14:
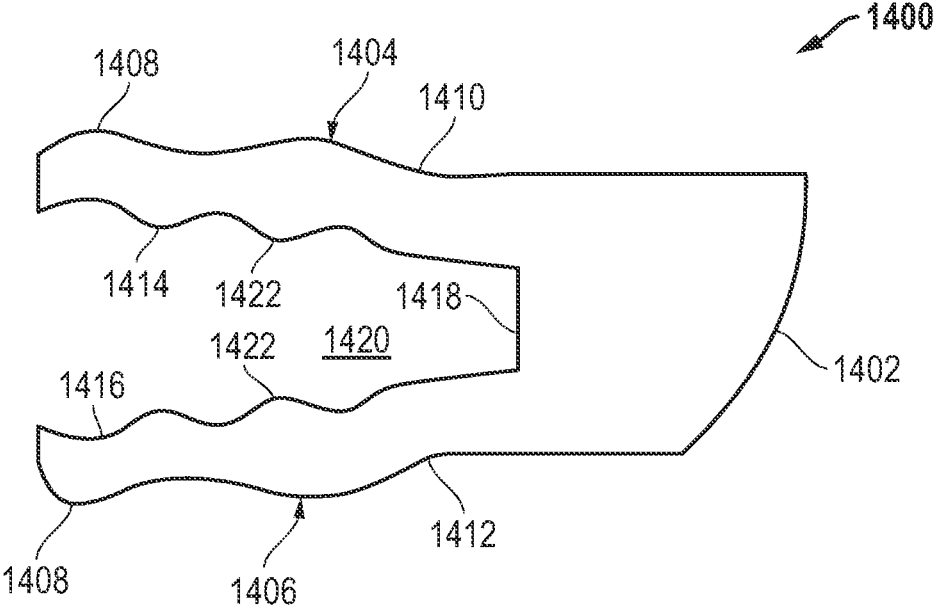

As shown in FIG. 14, the seat insert 1400 may generally comprise a first sealing surface 1402 that forms a first sealing interface with the ball 108 of the valve 100 to prevent leakage through a first leakage path. In some embodiments, the first sealing surface 1402 may be curved, curvilinear, planar, or combinations thereof. The seat insert 1400 may also comprise at least one sealing lip. In some embodiments, the seat insert 1400 may comprise plurality of sealing lips 1404, 1406. In some embodiments, the plurality of sealing lips 1404, 1406 may comprise an outer sealing lip 1404 and an inner sealing lip 1406. The outer sealing lip 1404 and the inner sealing lip 1406 may form a second sealing interface with first inner surface 112 of the seat insert cavity 110 and the second inner surface 114 of the seat insert cavity 110, respectively to prevent leakage through the second leakage path. Further, in some embodiments, one or more of the sealing lips 1404, 1406 may comprise sealing bumps, teeth, or undulations 1408 in contact with the seat insert cavity 110. In some embodiments, the sealing bumps, teeth, or undulations 1408 may be disposed on outer surfaces 1410, 1412 of one or more of the sealing lips 1404, 1406. The outer sealing lip 1404 may comprise an inner surface 1414. The inner sealing lip 1406 may also comprise an inner surface 1416. The inner surface 1414 of the outer sealing lip 1404, the inner surface 1416 of the inner sealing lip 1406, and an inner end 1418 may form a cavity 1420 in the seat insert 1400. In some embodiments, the inner surfaces 1414, 1416 of the sealing lips 1404, 1406 may comprise sealing bumps, teeth, or undulations 1422. Furthermore, in some embodiments, any of the seat inserts 1100, 1200, 1300 may comprise sealing bumps, teeth, or undulations 1422 on one or more of their respective inner surfaces 1114, 1116, 1214, 1216, 1314, 1316.

Embodiments of a seat insert 1100, 1200, 1300, 1400 may also comprise inner surfaces 1114, 1214, 1314, 1414 of the outer sealing leg 1104, 1204, 1304, 1404 that are different from their respective inner surfaces 1116, 1216, 1316, 1416 of the inner sealing leg 1106, 1206, 1306, 1406. For example, the inner surfaces 1114, 1214, 1314, 1414 of the outer sealing leg 1104, 1204, 1304, 1404 and the inner surfaces 1116, 1216, 1316, 1416 of the inner sealing leg 1106, 1206, 1306, 1406 may comprise any combination of flat, angled, curved, or dual angled surfaces as disclosed herein.

In some embodiments, the seat insert 1100, 1200, 1300, 1400 may be formed from PTFE, a fluoropolymer, a perfluoropolymer, PTFE, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof. In some embodiments, the seat insert 1100, 1200, 1300, 1400 may be formed from a material modified with at least one filler.

Figure 15:
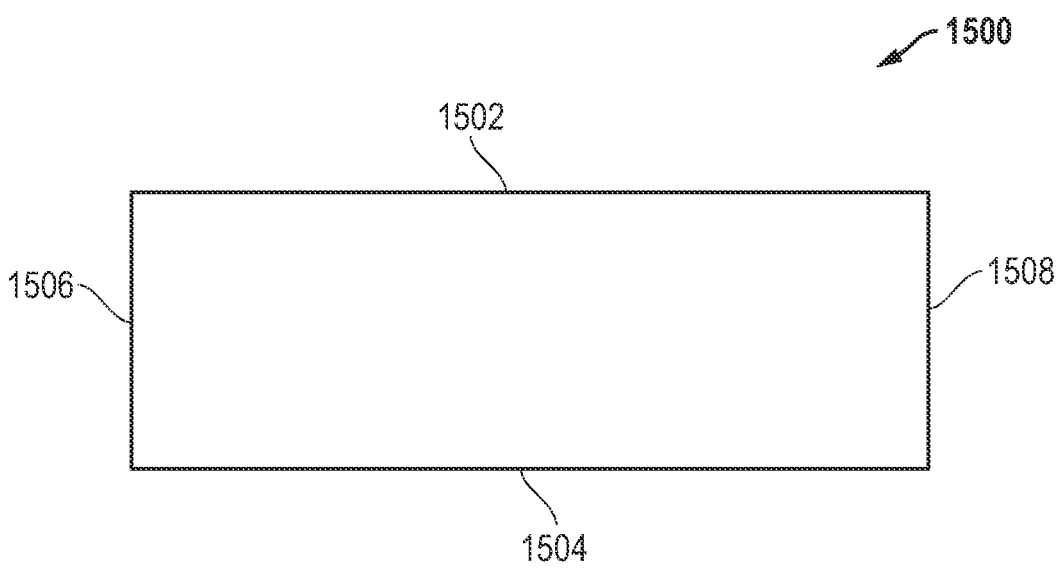
FIGS. 15 to 18 show partial cross-sectional views of various embodiments of an annular support ring according to embodiments of the disclosure.

FIGS. 15 to 18 are partial cross-sectional views of various embodiments of an annular support ring 1500, 1600, 1700, 1800 according to embodiments of the disclosure. As shown in FIG. 15, the support ring 1500 may generally comprise an outer surface 1502, an inner surface 1504 opposite the outer surface 1502, a first end 1506, and a second end 1508 opposite the first end 1506. The outer surface 1502 of the support ring 1500 may be configured to engage the inner surface 1114, 1214, 1314, 1414 of the outer sealing lip 1104, 1204, 1304, 1404 of the seat insert 1100, 1200, 1300, 1400. In some embodiments, the outer surface 1502 of the support ring 1500 may be flat. In some embodiments, the outer surface 1502 of the support ring 1500 may be substantially axially planar. The inner surface 1504 of the support ring 1500 may be configured to engage the inner surface 1116, 1216, 1316, 1416 of the inner sealing lip 1106, 1206, 1306, 1406 of the seat insert 1100, 1200, 1300, 1400. In some embodiments, the inner surface 1504 of the support ring 1500 may be flat. In some embodiments, the inner surface 1504 of the support ring 1500 may be substantially axially planar.

Figure 16:
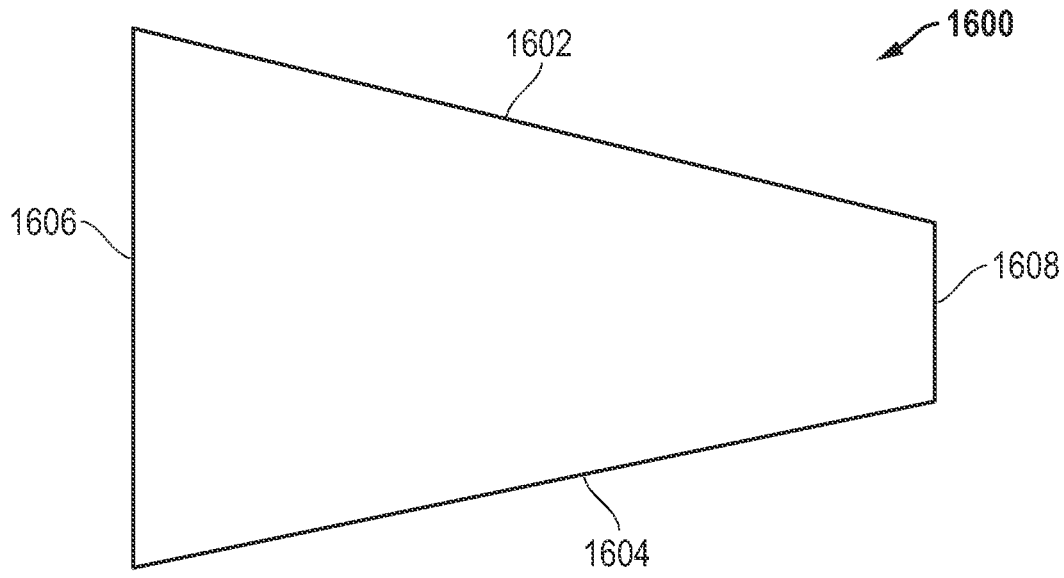

As shown in FIG. 16, the support ring 1600 may generally comprise an outer surface 1602, an inner surface 1604 opposite the outer surface 1602, a first end 1606, and a second end 1608 opposite the first end 1606. The outer surface 1602 of the support ring 1600 may be configured to engage the inner surface 1114, 1214, 1314, 1414 of the outer sealing lip 1104, 1204, 1304, 1404 of the seat insert 1100, 1200, 1300, 1400. In some embodiments, the outer surface 1602 of the support ring 1600 may be angled. In some embodiments, the outer surface 1602 of the support ring 1600 may comprise an angle ($\alpha$) with respect to the longitudinal axis 104 of the valve 100. In some embodiments, the outer surface 1602 of the support ring 1600 may comprise an angle ($\alpha$) of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees. In some embodiments, the outer surface 1602 of the support ring 1600 may comprise an angle ($\alpha$) of not greater than 45 degrees, not greater than 40 degrees, not greater than 35 degrees, not greater than 30 degrees, not greater than 25 degrees, not greater than 20 degrees, or not greater than 15 degrees. Further, it will be appreciated that the outer surface 1602 of the support ring 1600 may comprise an angle ($\alpha$) between any of these minimum and maximum values, such as at least 5 degrees and not greater than 45 degrees.

The inner surface 1604 of the support ring 1600 may be configured to engage the inner surface 1116, 1216, 1316, 1416 of the inner sealing lip 1106, 1206, 1306, 1406 of the seat insert 1100, 1200, 1300, 1400. In some embodiments, the inner surface 1604 of the support ring 1600 may be angled. In some embodiments, the inner surface 1604 of the support ring 1600 may comprise an angle ($\alpha$) with respect to the longitudinal axis 104 of the valve 100. In some embodiments, the inner surface 1604 of the support ring 1600 may comprise an angle ($\alpha$) of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees. In some embodiments, the inner surface 1604 of the support ring 1600 may comprise an angle ($\alpha$) of not greater than 45 degrees, not greater than 40 degrees, not greater than 35 degrees, not greater than 30 degrees, not greater than 25 degrees, not greater than 20 degrees, or not greater than 15 degrees. Further, it will be appreciated that the inner surface 1604 of the support ring 1600 may comprise an angle ($\alpha$) between any of these minimum and maximum values, such as at least 5 degrees and not greater than 45 degrees. Additionally, in some embodiments, the inner surface 1604 of the support ring 1600 may comprise a substantially similar angle as the outer surface 1602 of the support ring 1600. However, in some embodiments, the inner surface 1604 of the support ring 1600 may comprise a different angle from the outer surface 1602 of the support ring 1600.

Figure 17:
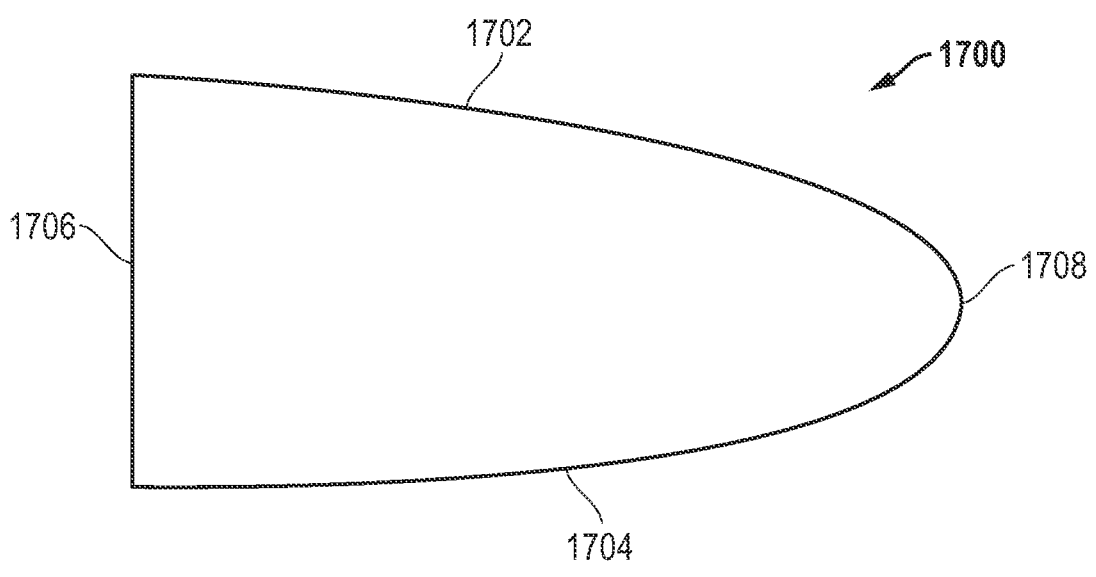

As shown in FIG. 17, the support ring 1700 may generally comprise an outer surface 1702, an inner surface 1704 opposite the outer surface 1702, a first end 1706, and a second end 1708 opposite the first end 1706. The outer surface 1702 of the support ring 1700 may be configured to engage the inner surface 1114, 1214, 1314, 1414 of the outer sealing lip 1104, 1204, 1304, 1404 of the seat insert 1100, 1200, 1300, 1400. In some embodiments, the outer surface 1702 of the support ring 1700 may be arced or curved. The inner surface 1704 of the support ring 1700 may be configured to engage the inner surface 1116, 1216, 1316, 1416 of the inner sealing lip 1106, 1206, 1306, 1406 of the seat insert 1100, 1200, 1300, 1400. In some embodiments, the inner surface 1704 of the support ring 1500 may be arced or curved.

Figure 18:
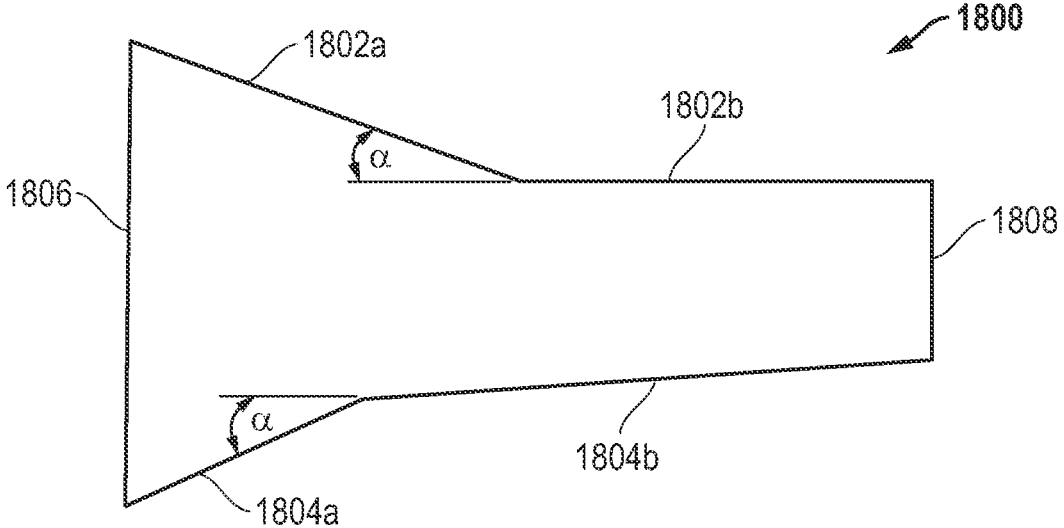

As shown in FIG. 18, the support ring 1800 may generally comprise an outer surface 1802, an inner surface 1804 opposite the outer surface 1802, a first end 1806, and a second end 1808 opposite the first end 1806. The outer surface 1802 of the support ring 1800 may be configured to engage the inner surface 1114, 1214, 1314, 1414 of the outer sealing lip 1104, 1204, 1304, 1404 of the seat insert 1100, 1200, 1300, 1400. In some embodiments, the outer surface 1802 of the support ring 1800 may be dual angled. In some embodiments, a first angled portion 1802a and a second angled portion 1802b of the outer surface 1802 of the support ring 1800 may comprise an angle ($\alpha$) with respect to the longitudinal axis 104 of the valve 100. In some embodiments, the first angled portion 1802a of the outer surface 1802 of the support ring 1800 may comprise an angle ($\alpha$) between 0 and 45 degrees. In some embodiments, the second angled portion 1802b of the outer surface 1802 of the support ring 1800 may comprise an angle ($\alpha$) between 0 and 45 degrees. Further, it will be appreciated that the first angled portion 1802a of the outer surface 1802 of the support ring 1800 and the second angled portion 1802b of the outer surface 1802 of the support ring 1800 may comprise different angles.

The inner surface 1804 of the support ring 1800 may be configured to engage the inner surface 1116, 1216, 1316, 1416 of the inner sealing lip 1106, 1206, 1306, 1406 of the seat insert 1100, 1200, 1300, 1400. In some embodiments, the inner surface 1804 of the support ring 1800 may be dual angled. In some embodiments, a first angled portion 1804a and a second angled portion 1804b of the inner surface 1804 of the support ring 1800 may comprise an angle ($\alpha$) with respect to the longitudinal axis 104 of the valve 100. In some embodiments, the first angled portion 1804a of the inner surface 1804 of the support ring 1800 may comprise an angle ($\alpha$) between 0 and 45 degrees. In some embodiments, the second angled portion 1804b of the inner surface 1804 of the support ring 1800 may comprise an angle ($\alpha$) between 0 and 45 degrees. Further, it will be appreciated that the first angled portion 1804a of the inner surface 1804 of the support ring 1800 and the second angled portion 1804b of the inner surface 1804 of the support ring 1800 may comprise different angles.

In some embodiments, the outer surface 1802 of the support ring 1800 and the inner surface 1804 of the support ring 1800 may be symmetrical. In other embodiments, the outer surface 1802 of the support ring 1800 and the inner surface 1804 of the support ring 1800 may be asymmetrical. In some embodiments, the first angled portions 1802a, 1804a may comprise substantially similar angles. In other embodiments, the first angled portions 1802a, 1804a may comprise different angles. In some embodiments, the second angled portions 1802b, 1804b may comprise substantially similar angles. In other embodiments, the second angled portions 1802b, 1804b may comprise different angles.

Embodiments of a support ring 1500, 1600, 1700, 1800 may also comprise outer surfaces 1502, 1602, 1702, 1802 that are different from their respective inner surfaces 1504, 1604, 1704, 1804. For example, the outer surfaces 1502, 1602, 1702, 1802 and the inner surfaces 1504, 1604, 1704, 1804 may comprise any combination of flat, angled, curved, or dual angled surfaces as disclosed herein.

In some embodiments, the support ring 1500, 1600, 1700, 1800 may be formed from a metallic material. In some embodiments, the metallic material may be nickel-chromium-based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze. In some embodiments, the support ring 1500, 1600, 1700, 1800 may comprise a coating or plating disposed over the metallic material. In some embodiments, the coating or plating may comprise a gold plating, a silver plating, a nickel plating, an aluminum chromium nitride (AlCrN) plating, a titanium aluminum nitride (TiAlN) plating, any other wear resistant metallic plating, or any combination thereof. Furthermore, in some embodiments, the support ring 1500, 1600, 1700, 1800 may comprise a split ring or split-type band.

When assembled, the seat insert assembly 1050 may be at least partially disposed within the seat insert cavity 110 of the valve 100. The first end 1506, 1606, 1706, 1806 of the support ring 1500, 1600, 1700, 1800 may be in contact with the back surface 116 of the seat insert cavity 110 of the valve 100. Additionally, the second end 1508, 1608, 1708, 1808 of the support ring 1500, 1600, 1700, 1800 may not be in contact with the inner end 1118, 1218, 1318, 1418 of the seat insert 1100, 1200, 1300, 1400, such that there is a gap or void between the second end 1508, 1608, 1708, 1808 of the support ring 1500, 1600, 1700, 1800 and the inner end 1118, 1218, 1318, 1418 of the seat insert 1100, 1200, 1300, 1400. In some embodiments, the second end 1508, 1608, 1708, 1808 of the support ring 1500, 1600, 1700, 1800 may be flat. In some embodiments, the second end 1508, 1608, 1708, 1808 of the support ring 1500, 1600, 1700, 1800 may be curved or rounded.

The support ring 1500, 1600, 1700, 1800 may be engaged with the sealing lips 1104, 1106, 1204, 1206, 1304, 1306, 1404, 1406 and configured to bias the sealing lips 1104, 1106, 1204, 1206, 1304, 1306, 1404, 1406 against a portion of the seat insert cavity 110. More specifically, the support ring 1500, 1600, 1700, 1800 may be disposed between the inner surface 1114, 1214, 1314, 1414 of the outer sealing lip 1104, 1204, 1304, 1404 and the inner surface 1116, 1216, 1316, 1416 of the inner sealing lip 1106, 1206, 1306, 1406. In some embodiments, the outer surface 1502, 1602, 1702, 1802 of the support ring 1500, 1600, 1700, 1800 may be configured to engage the inner surface 1114, 1214, 1314, 1414 of the outer sealing lip 1104, 1204, 1304, 1404 and bias the outer sealing lip 1104, 1204, 1304, 1404 against the first inner surface 112 of the seat insert cavity 110, such that the outer surface 1110, 1210, 1310, 1410 of the outer sealing lip 1104, 1204, 1304, 1404 is in contact with the first inner surface 112 of the seat insert cavity 110 of the valve 100. Additionally, in some embodiments, the inner surface 1504, 1604, 1704, 1804 of the support ring 1500, 1600, 1700, 1800 may be configured to engage the inner surface 1116, 1216, 1316, 1416 of the inner sealing lip 1106, 1206, 1306, 1406 and bias the inner sealing lip 1106, 1206, 1306, 1406 against the second inner surface 114 of the seat insert cavity 110, such that the outer surface 1112, 1212, 1312, 1412 of the inner sealing lip 1106, 1206, 1306, 1406 is in contact with the second inner surface 114 of the seat insert cavity 110 of the valve 100.

In this configuration, pressure from contact between the seat insert 1100, 1200, 1300, 1400 and the ball 108 of the valve 100 biases or forces the support ring 1500, 1600, 1700, 1800 axially towards the seat insert 1100, 1200, 1300, 1400 to bias the sealing lips 1104, 1106, 1204, 1206, 1304, 1306, 1404, 1406 against the inner surfaces 112, 114 of the seat insert cavity 110, to increase contact pressure against the inner surfaces 112, 114 of the seat insert cavity 110, or combinations thereof to prevent leakage through the secondary leakage path. Furthermore, t will be appreciated that embodiments of a seat insert assembly 1050 may comprise any combination of a seat insert 1100, 1200, 1300, 1400 and a support ring 1500, 1600, 1700, 1800.

Figure 19:
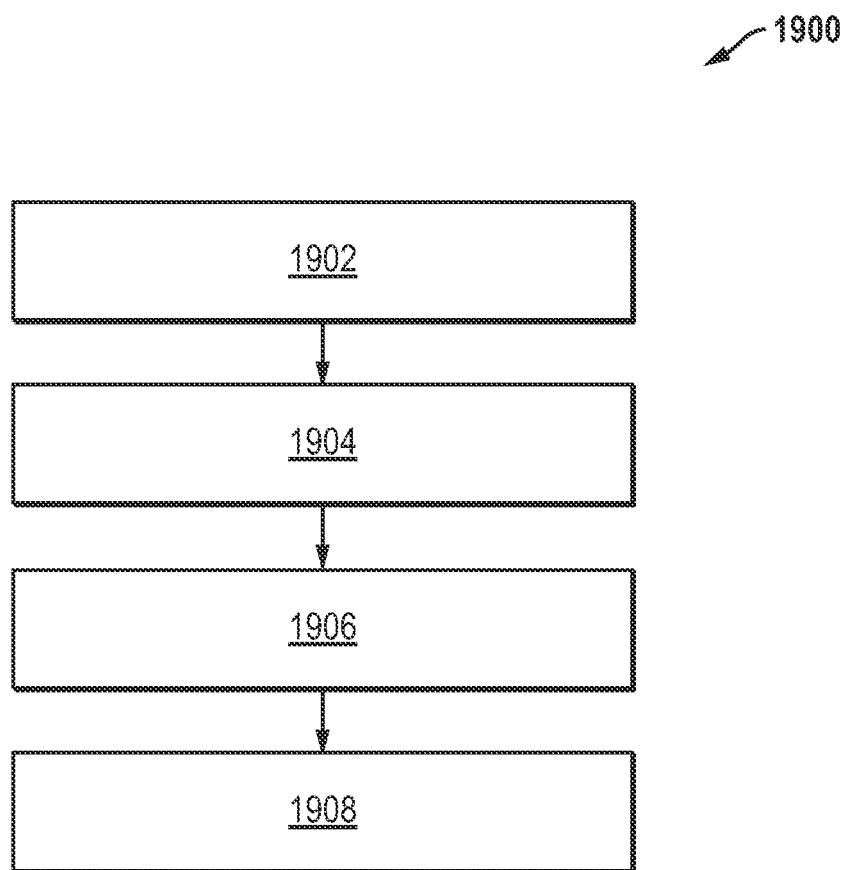
FIG. 19 shows a flowchart of a method of preventing leakage in a valve according to an embodiment of the disclosure.

FIG. 19 is a flowchart of a method 1900 of preventing leakage in a valve according to an embodiment of the disclosure. The method 1900 may begin at block 1902 by providing a valve comprising a valve body, a ball selectively rotatable within the valve, a seat insert cavity formed within the valve body, and a seat insert assembly according to any of the embodiments disclosed herein. The method 1900 may continue at block 1904 by operating the valve. The method 1900 may continue at block 1906 by selectively rotating the ball to prevent fluid flow along a flow path through the valve. The method 1900 may continue at block 1908 by forming or maintaining a first sealing interface between the first sealing surface of the seat insert and the ball to prevent leakage through a first leakage path and simultaneously forming or maintaining a second sealing interface between the second sealing surface and the angled wall to prevent leakage through a second leakage path while the ball is selectively rotated to prevent fluid flow along the flow path through the valve. In some embodiments, operating the valve may occur at cryogenic temperatures.

In still other embodiments, a valve, a seat insert assembly, or a method of preventing leakage in a valve may include one or more of the following embodiments:

Embodiment 1. A seat insert assembly, comprising: a seat insert comprising at least one sealing lip; and a support ring engaged with the at least one sealing lip and configured to bias the at least one sealing lip against a portion of a seat insert cavity.

Embodiment 2. The seat insert assembly of embodiment 1, wherein the seat insert comprises a first sealing surface that forms a first sealing interface with a ball of a valve to prevent leakage through a first leakage path.

Embodiment 3. The seat insert assembly of embodiment 2, wherein the first sealing surface is curved, curvilinear, planar, or combinations thereof.

Embodiment 4. The seat insert assembly of any of embodiments 2 to 3, wherein the least one sealing lip forms a second sealing interface with the portion of the seat insert cavity to prevent leakage through a second leakage path.

Embodiment 5. A valve, comprising: a valve body; a ball selectively rotatable within the valve body; a seat insert cavity formed within the valve body; and a seat insert assembly at least partially disposed within the seat insert cavity, the seat insert assembly comprising: a seat insert comprising at least one sealing lip; and a support ring engaged with the at least one sealing lip and configured to bias the at least one sealing lip against a portion of the seat insert cavity.

Embodiment 6. The valve of embodiment 5, wherein the seat insert comprises a first sealing surface that forms a first sealing interface with the ball of the valve to prevent leakage through a first leakage path.

Embodiment 7. The valve of embodiment 6, wherein the first sealing surface is curved, curvilinear, planar, or combinations thereof.

Embodiment 8. The valve of any of embodiments 6 to 7, wherein the least one sealing lip forms a second sealing interface with the portion of the seat insert cavity to prevent leakage through a second leakage path.

Embodiment 9. The seat insert assembly or the valve of any of embodiments 1 to 8, wherein the at least one sealing lip comprises a single sealing lip.

Embodiment 10. The seat insert assembly or the valve of embodiment 9, wherein the sealing lip is an outer sealing lip, and wherein the portion of the seat insert cavity is a first inner surface of the seat insert cavity.

Embodiment 11. The seat insert assembly or the valve of embodiment 10, wherein the sealing lip comprises an inner surface.

Embodiment 12. The seat insert assembly or the valve of embodiment 11, wherein the inner surface of the sealing lip is flat.

Embodiment 13. The seat insert assembly or the valve of embodiment 11, wherein the inner surface of the sealing lip is angled.

Embodiment 14. The seat insert assembly or the valve of embodiment 13, wherein the inner surface of the sealing lip comprises an angle of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees.

Embodiment 15. The seat insert assembly or the valve of embodiment 14, wherein the inner surface of the sealing lip comprises an angle of not greater than 45 degrees, not greater than 40 degrees, not greater than 35 degrees, not greater than 30 degrees, not greater than 25 degrees, not greater than 20 degrees, or not greater than 15 degrees.

Embodiment 16. The seat insert assembly or the valve of embodiment 11, wherein the inner surface of the sealing lip is curved.

Embodiment 17. The seat insert assembly or the valve of any of embodiments 11 to 16, wherein the inner surface of the sealing lip comprises sealing bumps, teeth, or undulations.

Embodiment 18. The seat insert assembly or the valve of any of embodiments 11 to 17, wherein the support ring comprises an outer surface configured to engage the inner surface of the sealing lip.

Embodiment 19. The seat insert assembly or the valve of embodiment 18, wherein the outer surface of the support ring is flat.

Embodiment 20. The seat insert assembly or the valve of embodiment 18, wherein the outer surface of the support ring is angled.

Embodiment 21. The seat insert assembly or the valve of embodiment 20, wherein the outer surface of the support ring comprises an angle of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees.

Embodiment 22. The seat insert assembly or the valve of embodiment 21, wherein the outer surface of the support ring comprises an angle of not greater than 45 degrees, not greater than 40 degrees, not greater than 35 degrees, not greater than 30 degrees, not greater than 25 degrees, not greater than 20 degrees, or not greater than 15 degrees.

Embodiment 23. The seat insert assembly or the valve of embodiment 18, wherein the outer surface of the support ring is arced.

Embodiment 24. The seat insert assembly or the valve of embodiment 18, wherein the outer surface of the support ring is dual angled.

Embodiment 25. The seat insert assembly or the valve of embodiment 24, wherein a first angled portion of the outer surface of the support ring is between 0 and 45 degrees.

Embodiment 26. The seat insert assembly or the valve of embodiment 25, wherein a second angled portion of the outer surface of the support ring is between 0 and 45 degrees.

Embodiment 27. The seat insert assembly or the valve of embodiment 26, wherein the first angled portion of the outer surface of the support ring and the second angled portion of the outer surface of the support ring comprise different angles.

Embodiment 28. The seat insert assembly or the valve of any of embodiments 1 to 27, wherein a first end of the support ring is in contact with a back surface of the seat insert cavity.

Embodiment 29. The seat insert assembly or the valve of embodiment 28, wherein the back surface is radial.

Embodiment 30. The seat insert assembly or the valve of any of embodiments 28 to 29, wherein a second end of the support ring is not in contact with an inner end of the seat insert, such that there is a gap between the second end of the support ring and the seat insert.

Embodiment 31. The seat insert assembly or the valve of embodiment 30, wherein the second end is flat.

Embodiment 32. The seat insert assembly or the valve of embodiment 30, wherein the second end is rounded.

Embodiment 33. The seat insert assembly or the valve of any of embodiments 28 to 32, wherein an inner surface of the support ring is in contact with an inner surface of the seat insert cavity.

Embodiment 34. The seat insert assembly or the valve of any of embodiments 10 to 33, wherein the support ring biases the sealing lip against the inner surface of seat insert cavity.

Embodiment 35. The seat insert assembly or the valve of embodiment 34, wherein pressure from contact between the seat insert and the ball of the valve biases or forces the support ring axially towards the seat insert to bias the sealing lip against the inner surface of the seat insert cavity, to increase contact pressure against the inner surface of the seat insert cavity, or combinations thereof to prevent leakage through the secondary leakage path.

Embodiment 36. The seat insert assembly or the valve of any of embodiments 1 to 35, wherein the sealing lip comprises sealing bumps, teeth, or undulations in contact with the seat insert cavity.

Embodiment 37. The seat insert assembly or the valve of any embodiments 1 to 8, wherein the at least one sealing lip comprises a plurality of sealing lips.

Embodiment 38. The seat insert assembly or the valve of embodiment 37, wherein the plurality of sealing lips comprise an outer sealing lip and an inner sealing lip, and wherein the portion of the seat insert cavity is a first inner surface of the seat insert cavity and a second inner surface of the seat insert cavity.

Embodiment 39. The seat insert assembly or the valve of embodiment 38, wherein the outer sealing lip comprises an inner surface, and wherein the inner sealing lip comprises an inner surface.

Embodiment 40. The seat insert assembly or the valve of embodiment 39, wherein the inner surfaces of the outer sealing lip and the inner sealing lip are flat.

Embodiment 41. The seat insert assembly or the valve of embodiment 39, wherein the inner surfaces of the outer sealing lip and the inner sealing lip are angled.

Embodiment 42. The seat insert assembly or the valve of embodiment 41, wherein the inner surfaces of the outer sealing lip and the inner sealing lip comprise substantially similar angles.

Embodiment 43. The seat insert assembly or the valve of embodiment 41, wherein the inner surfaces of the outer sealing lip and the inner sealing lip comprise different angles.

Embodiment 44. The seat insert assembly or the valve of any of embodiments 41 to 43, wherein the inner surfaces of the outer sealing lip and the inner sealing lip comprise an angle of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees.

Embodiment 45. The seat insert assembly or the valve of embodiment 44, wherein the inner surfaces of the outer sealing lip and the inner sealing lip comprise an angle of not greater than 45 degrees, not greater than 40 degrees, not greater than 35 degrees, not greater than 30 degrees, not greater than 25 degrees, not greater than 20 degrees, or not greater than 15 degrees.

Embodiment 46. The seat insert assembly or the valve of embodiment 39, wherein the inner surfaces of the outer sealing lip and the inner sealing lip are curved.

Embodiment 47. The seat insert assembly or the valve of any of embodiments 39 to 46, wherein the inner surfaces of the outer sealing lip and the inner sealing lip comprises sealing bumps, teeth, or undulations.

Embodiment 48. The seat insert assembly or the valve of any of embodiments 39 to 47, wherein the support ring comprises an outer surface configured to engage the inner surface of the outer sealing lip and an inner surface configured to engage the inner surface of the inner sealing lip.

Embodiment 49. The seat insert assembly or the valve of embodiment 48, wherein the outer surface of the support ring is flat.

Embodiment 50. The seat insert assembly or the valve of embodiment 48, wherein the outer surface of the support ring is angled.

Embodiment 51. The seat insert assembly or the valve of embodiment 50, wherein the outer surface of the support ring comprises an angle of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees.

Embodiment 52. The seat insert assembly or the valve of embodiment 51, wherein the outer surface of the support ring comprises an angle of not greater than 45 degrees, not greater than 40 degrees, not greater than 35 degrees, not greater than 30 degrees, not greater than 25 degrees, not greater than 20 degrees, or not greater than 15 degrees.

Embodiment 53. The seat insert assembly or the valve of embodiment 48, wherein the outer surface of the support ring is arced.

Embodiment 54. The seat insert assembly or the valve of embodiment 48, wherein the outer surface of the support ring is dual angled.

Embodiment 55. The seat insert assembly or the valve of embodiment 54, wherein a first angled portion of the outer surface of the support ring is between 0 and 45 degrees.

Embodiment 56. The seat insert assembly or the valve of embodiment 55, wherein a second angled portion of the outer surface of the support ring is between 0 and 45 degrees.

Embodiment 57. The seat insert assembly or the valve of embodiment 56, wherein the first angled portion of the outer surface of the support ring and the second angled portion of the outer surface of the support ring comprise different angles.

Embodiment 58. The seat insert assembly or the valve of embodiment 48, wherein the inner surface of the support ring is flat.

Embodiment 59. The seat insert assembly or the valve of embodiment 48, wherein the inner surface of the support ring is angled.

Embodiment 60. The seat insert assembly or the valve of embodiment 59, wherein the inner surface of the support ring comprises a substantially similar angle as the outer surface of the support ring.

Embodiment 61. The seat insert assembly or the valve of embodiment 59, wherein the inner surface of the support ring comprises a different angle from the outer surface of the support ring.

Embodiment 62. The seat insert assembly or the valve of any of embodiments 59 to 61, wherein the inner surface of the support ring comprises an angle of at least 1 degree, at least 2 degrees, at least 3 degrees, at least 4 degrees, at least 5 degrees, at least 10 degrees, at least 15 degrees, at least 20 degrees, at least 25 degrees, or at least 30 degrees.

Embodiment 63. The seat insert assembly or the valve of embodiment 62, wherein the inner surface of the support ring comprises an angle of not greater than 45 degrees, not greater than 40 degrees, not greater than 35 degrees, not greater than 30 degrees, not greater than 25 degrees, not greater than 20 degrees, or not greater than 15 degrees.

Embodiment 64. The seat insert assembly or the valve of embodiment 48, wherein the inner surface of the support ring is arced.

Embodiment 65. The seat insert assembly or the valve of embodiment 48, wherein the inner surface of the support ring is dual angled.

Embodiment 66. The seat insert assembly or the valve of embodiment 65, wherein a first angled portion of the inner surface of the support ring is between 0 and 45 degrees.

Embodiment 67. The seat insert assembly or the valve of embodiment 66, wherein a second angled portion of the inner surface of the support ring is between 0 and 45 degrees.

Embodiment 68. The seat insert assembly or the valve of embodiment 67, wherein the first angled portion of the inner surface of the support ring and the second angled portion of the inner surface of the support ring comprise different angles.

Embodiment 69. The seat insert assembly or the valve of any of embodiments 48 to 68, wherein the inner surface of the support ring and the outer surface of the support ring are symmetrical.

Embodiment 70. The seat insert assembly or the valve of any of embodiments 48 to 68, wherein the inner surface of the support ring and the outer surface of the support ring are asymmetrical.

Embodiment 71. The seat insert assembly or the valve of any of embodiments 37 to 70, wherein a first end of the support ring is in contact with a back surface of the seat insert cavity.

Embodiment 72. The seat insert assembly or the valve of embodiment 71, wherein the back surface is radial.

Embodiment 73. The seat insert assembly or the valve of any of embodiments 71 to 72, wherein a second end of the support ring is not in contact with an inner end of the seat insert, such that there is a gap between the second end of the support ring and the seat insert.

Embodiment 74. The seat insert assembly or the valve of embodiment 73, wherein the second end is disposed between the outer surface of the support ring and the inner surface of the support ring.

Embodiment 75. The seat insert assembly or the valve of embodiment 74, wherein the second end is flat.

Embodiment 76. The seat insert assembly or the valve of embodiment 74, wherein the second end is rounded.

Embodiment 77. The seat insert assembly or the valve of any of embodiments 71 to 76, wherein the support ring is disposed between the inner surface of the outer sealing lip and the inner surface of the inner sealing lip.

Embodiment 78. The seat insert assembly or the valve of any of embodiments 38 to 77, wherein the support ring biases the outer sealing lip against the first inner surface of the seat insert cavity and biases the inner sealing lip against the second inner surface of the seat insert cavity.

Embodiment 79. The seat insert assembly or the valve of embodiment 78, wherein pressure from contact between the seat insert and the ball of the valve biases or forces the support ring axially towards the seat insert to bias the outer sealing lip against the first inner surface of the seat insert cavity and to bias the inner sealing lip against the second inner surface of the seat insert cavity, to increase contact pressure against the first inner surface of the seat insert cavity and the second inner surface of the seat insert cavity, or combinations thereof to prevent leakage through the secondary leakage path.

Embodiment 80. The seat insert assembly or the valve of any of embodiments 1 to 8 or 37 to 79, wherein the sealing lip comprises sealing bumps, teeth, or undulations in contact with the seat insert cavity.

Embodiment 81. The seat insert assembly or the valve of any of embodiments 1 to 80, wherein the seat insert is formed from PTFE, a fluoropolymer, a perfluoropolymer, PTFE, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof.

Embodiment 82. The seat insert assembly or the valve of embodiment 81, wherein the seat insert is formed from a material modified with at least one filler.

Embodiment 83. The seat insert assembly or the valve of any of embodiments 1 to 82, wherein the support ring is formed from a metallic material.

Embodiment 84. The seat insert assembly or the valve of embodiment 83, wherein the metallic material is nickel-chromium-based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze.

Embodiment 85. The seat insert assembly or the valve of embodiment 84, further comprising: a coating or plating disposed over the metallic material.

Embodiment 86. The seat insert assembly or the valve of embodiment 85, wherein the coating or plating comprises a gold plating, a silver plating, a nickel plating, an aluminum chromium nitride (AlCrN) plating, a titanium aluminum nitride (TiAlN) plating, any other wear resistant metallic plating, or any combination thereof.

Embodiment 87. The seat insert assembly or the valve of any of embodiments 1 to 86, wherein the support ring is a split ring or split-type band.

Embodiment 88. A method of preventing leakage in a valve, comprising: providing a valve comprising a valve body, a ball selectively rotatable within the valve, a seat insert cavity formed within the valve body, and a seat insert assembly according to any of the preceding embodiments; operating the valve; selectively rotating the ball to prevent fluid flow along a flow path through the valve; and forming or maintaining a first sealing interface between the first sealing surface of the seat insert and the ball to prevent leakage through a first leakage path and simultaneously forming or maintaining a second sealing interface between the second sealing surface and the angled wall to prevent leakage through a second leakage path while the ball is selectively rotated to prevent fluid flow along the flow path through the valve.

Embodiment 89. The method of embodiment 88, wherein operating the valve occurs in cryogenic temperature conditions.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:
1. A valve, comprising:
a valve body;
a ball selectively rotatable within the valve body;
a seat insert cavity formed within the valve body; and
a seat insert assembly at least partially disposed within the seat insert cavity, the seat insert assembly comprising:
a seat insert comprising a plurality of sealing lips forming a cavity; and

20 a support ring engaged with an inner surface of the plurality of sealing lips in the cavity and configured to bias the plurality of sealing lips outwardly against a portion of an inner surface defining the seat insert cavity, wherein the support ring comprises an outer surface and an inner surface, wherein at least one of the outer surface or the inner surface of the support ring is angled outward where it engages the plurality of sealing lips in the cavity; and
wherein at least one sealing lip of the plurality of sealing lips comprises sealing bumps, teeth, or undulations that are spaced apart from the support ring and have a concavity between each of the sealing bumps, teeth or undulations, and wherein the support ring has a generally trapezoidal cross-sectional shape.
2. The valve of claim 1, wherein the seat insert comprises a first sealing surface that forms a first sealing interface with the ball of the valve to prevent leakage through a first leakage path.
3. The valve of claim 2, wherein the first sealing surface is curved, curvilinear, planar, or combinations thereof.
4. The valve of claim 2, wherein the least one sealing lip of the plurality of sealing lips forms a second sealing interface with the portion of the inner surface defining the seat insert cavity to prevent leakage through a second leakage path.
5. A method of preventing leakage in a valve, comprising:
providing a valve comprising a valve body, a ball selectively rotatable within the valve, a seat insert cavity formed within the valve body, and a seat insert assembly comprising: a seat insert comprising a plurality of sealing lips forming a cavity; and a support ring engaged with an inner surface of the plurality of sealing lips in the cavity and configured to bias the plurality of sealing lips outwardly against a portion of an inner surface defining a seat insert cavity, wherein at least one sealing lip of the plurality of sealing lips comprise sealing bumps, teeth, or undulations and have a concavity between each of the sealing bumps, teeth or undulations, wherein the support ring comprises an outer surface and an inner surface, wherein at least one of the outer surface or the inner surface of the support ring is angled outward where it engages the plurality of sealing lips in the cavity;
operating the valve;
selectively rotating the ball to prevent fluid flow along a flow path through the valve; and
forming or maintaining a first sealing interface between a first sealing surface of the seat insert and the ball to prevent leakage through a first leakage path and simultaneously forming or maintaining a second sealing interface between a second sealing surface and an angled wall to prevent leakage through a second leakage path while the ball is selectively rotated to prevent fluid flow along the flow path through the valve; and
using bumps, teeth, or undulations on at least one sealing lip of the plurality of sealing lips to allow continuous engagement with the sealing ring and seat insert cavity in a cryogenic condition, wherein the support ring has a generally trapezoidal cross-sectional shape.

* * * * *